United States Patent
Isabel et al.

(10) Patent No.: US 9,116,871 B2
(45) Date of Patent: Aug. 25, 2015

(54) INK TO TEXT REPRESENTATION CONVERSION

(71) Applicant: Microsoft Corporation, Redmond, WA (US)

(72) Inventors: Matthew Isabel, Seattle, WA (US); Tristan Davis, Redmond, WA (US); Michael Vandekerkhof, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 13/898,273

(22) Filed: May 20, 2013

(65) Prior Publication Data

US 2014/0344662 A1 Nov. 20, 2014

(51) Int. Cl.
*G06K 9/00* (2006.01)
*G06F 17/24* (2006.01)
*G06K 9/22* (2006.01)
*G06F 3/0488* (2013.01)

(52) U.S. Cl.
CPC .......... *G06F 17/241* (2013.01); *G06F 3/04883* (2013.01); *G06F 17/242* (2013.01); *G06K 9/222* (2013.01)

(58) Field of Classification Search
CPC .... G06F 17/241; G06F 3/04883; G06K 9/222
USPC .......................................... 345/173; 382/188
See application file for complete search history.

(56) References Cited

U.S. PATENT DOCUMENTS

| 7,574,048 | B2 | 8/2009 | Shilman et al. |
| 8,250,463 | B2 | 8/2012 | Bargeron et al. |
| 8,294,959 | B2 * | 10/2012 | Ireland et al. ............. 358/474 |
| 8,363,949 | B2 | 1/2013 | Rowley et al. |
| 8,438,489 | B2 * | 5/2013 | Barthelmess et al. ....... 715/751 |
| 2003/0004991 | A1 * | 1/2003 | Keskar et al. ............. 707/512 |

(Continued)

FOREIGN PATENT DOCUMENTS

| CN | 102768616 A | 11/2012 |
| WO | 2005029391 A1 | 3/2005 |

OTHER PUBLICATIONS

"AutoInk plug-in for Adobe Acrobat", Retrieved at <<http://www.evermap.com/autoink.asp>>, Retrieved Date: Mar. 12, 2013, pp. 5.

(Continued)

*Primary Examiner* — Gregory M Desire
(74) *Attorney, Agent, or Firm* — Jessica Meyers; Jim Ross; Micky Minhas (57) ABSTRACT

Technologies are generally provided for converting handwritten ink input to text annotations. A user may provide handwritten ink input to content displayed on a computing device to edit and mark up the content. The ink input may be provided employing touch or an electronic stylus on a user interface of the computing device to edit the content. The ink input may be processed to identify insertion of comments, deletion of text, and to identify insertion of markup symbols and shapes. The ink input may be converted to a text annotation based on a context of the ink input and a grammar and proofreading analysis. The text annotation may be displayed in an annotation view. The ink input may be converted periodically after predefined periods of time and upon detection of selection of a conversion button to activate conversion of the ink input.

20 Claims, 7 Drawing Sheets

(56) References Cited

U.S. PATENT DOCUMENTS

| | | | |
|---|---|---|---|
| 2004/0146221 A1* | 7/2004 | Siegel et al. | 382/305 |
| 2004/0165774 A1* | 8/2004 | Koubaroulis et al. | 382/179 |
| 2005/0289452 A1* | 12/2005 | Kashi et al. | 715/512 |
| 2009/0161958 A1 | 6/2009 | Markiewicz et al. | |
| 2010/0074527 A1 | 3/2010 | Vukosavljevic et al. | |
| 2011/0216015 A1* | 9/2011 | Edwards | 345/173 |
| 2012/0293418 A1 | 11/2012 | Garside et al. | |
| 2014/0210734 A1* | 7/2014 | Windbrake et al. | 345/173 |
| 2014/0344662 A1* | 11/2014 | Isabel et al. | 715/230 |

OTHER PUBLICATIONS

"Microsoft Visio 2010: Organizing and Annotating Diagrams—Markup & Review", Retrieved at <<http://allcomputers.us/windows_7/microsoft-visio-2010—organizing-and-annotating-diagrams—markup—review.aspx>>, Nov. 26, 2012, pp. 5.

"Guide to Pen-and-Ink functionality in Windows Vista* and Office 2007 using e-epens", Retrieved at <<http://e-pens.com/downloads/e-pens%20Guide%20to%20MS%20Vista%20and%20MS%20Office%20Pen%20Pen%20&%20Ink%20Functions.pdf>>, Retrieved Date: Mar. 12, 2013, pp. 7.

Conroy, et al., "ProofRite: A Paper-Augmented Word Processor", Retrieved at <<http://www.cs.cornell.edu/~francois/Papers/ProofRite.pdf>>, In the Human-Computer Interaction Lab, May 2004, pp. 34.

"Annotations Overview", Retrieved at <<http://msdn.microsoft.com/en-us/library/ms748864.aspx>>, Retrieved Date: Mar. 12, 2013, pp. 5.

"Mark up a Document with Ink Annotations", Retrieved at <<http://office.microsoft.com/en-us/word-help/mark-up-a-document-with-ink-annotations-HP001033697.aspx>>, Retrieved Date: Mar. 12, 2013, p. 1.

"International Search Report and Written Opinions Issued in PCT Application No. PCT/US2014/038532", Mailed Date: Mar. 18, 2015, 12 Pages.

Hardock, et al., "A Marking Based Interface for Collaborative Writing", In Proceedings of the 6th Annual ACM Symposium on User Interface Software and Technology, Nov. 3, 1993, pp. 259-266.

Pimentel, et al., "Enhancing Multimodal Annotations with Pen-Based Information", In Ninth IEEE International Symposium on Multimedia Workshops, Dec. 10, 2007, pp. 207-212.

Vilar, et al., "A Flexible System for Document Processing and Text Transcription", In Proceedings of the Current Topics in Artificial Intelligence, and 13th Conference on Spanish Association for Artificial Intelligence, Nov. 9, 2009, pp. 291-300.

* cited by examiner

INK TO TEXT REPRESENTATION CONVERSION

BACKGROUND

Mobile computing has transformed media consumption across markets. Miniaturization across product generations has enabled more functionality to be accomplished by smaller devices. Users may view and interact with documents on smaller computing devices such as smart phones and tablets. Some smaller computing devices enable touch interaction employing fingers and electronic pens to provide handwritten input on content viewed on the computing devices. Users may provide content and may annotate and mark up existing content viewed on smaller computing devices with their own handwriting, and the handwritten content as well as form factors may be displayed on the interface of the computing device. Handwriting is a natural input method—it is something people can do without thinking about it, which may be preferable as it gets people thinking about the content instead of the software they are using to read and/or annotate the content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to converting handwritten ink input to text representation on content displayed on a computing device. A user may provide handwritten ink input to content displayed on a computing device to edit and mark up the content. The ink input may be provided through a gesture on a user interface of the computing device to edit the content. Ink input may include insertion of comments and text, deletion of text, and insertion of markup symbols and shapes. The ink input may be converted to a text annotation based on a context of the ink input on the content and a grammar and proofreading analysis. The ink input may also be displayed in an annotation view of the content. In addition, the ink input may be converted periodically after predefined periods of time and upon detecting a selection of a conversion button to activate conversion of the ink input.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, handwritten ink input may be applied to content displayed on a user interface of a computing device, and the ink input may be converted to text annotations. Ink input may be provided through a touch, a gesture, a keyboard, a mouse, a pen, an eye tracking, or similar input to a user interface of the computing device to edit the content. Ink input may include insertion of comments and text, deletion of text, and insertion of markup symbols and shapes. The ink input may be converted to a text annotation for rendering based on a context of the ink input on the content and a grammar and proofreading analysis.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for converting ink input to text annotations. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
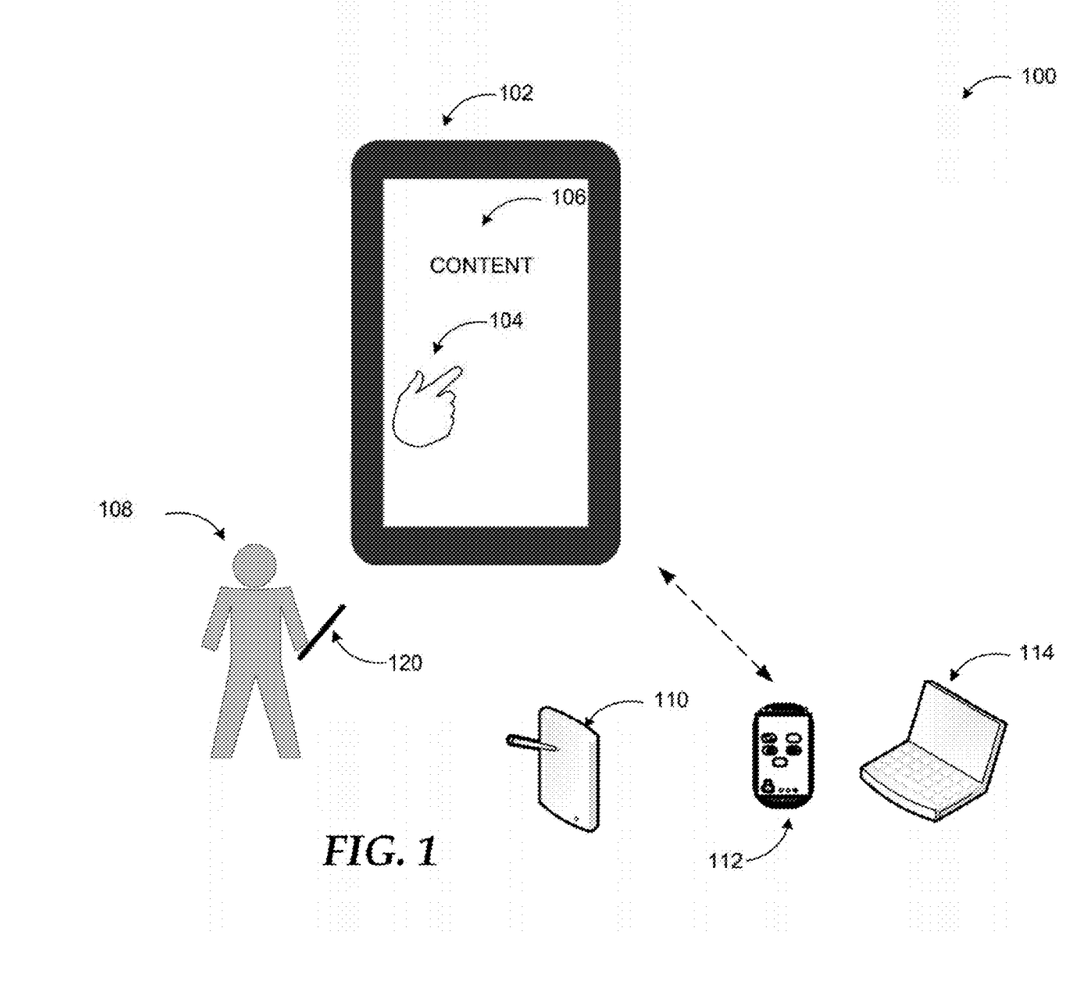
FIG. 1 illustrates an example computing device enabling insertion of ink input and conversion to text annotations, according some embodiments.

FIG. 1 illustrates an example computing device enabling insertion of ink input and conversion to text representations according to embodiments. The components and environments shown in diagram 100 are for illustration purposes. Embodiments may be implemented in various local, networked, cloud-based and similar computing environments employing a variety of computing devices and systems, hardware and software.

A computing device such as a tablet 102 may host an application providing content 106 to a user 108. The device 102 may enable the user to interact with the content 106. Other computing devices providing the content 106 and enabling interaction with the content may include a smart phone 112, a reader device 110, and a laptop computer. An example application providing content 106 may be a word processing application, a spreadsheet application, a presentation application, a web browser application, an e-reader application, and similar ones. The application may be a locally installed and executed application. The application may also receive and provide the content 106 through wired or wireless networks.

Content 106 may be any type of consumable data including but not exclusive to text, audio, video, graphic, and comparable ones. Content 106 may also include media combinations presented in a standardized format (e.g., ePub, HTML, XHTML, etc.) Content 106 may be provided by a content server hosting the content 106 for consumption by services and devices.

The application executed at the computing device 102 may be configured to enable the user 108 to interact with a user interface of the computing device 102 to provide and edit the content 106. For example, the user may employ various input methods to interact with the content 106 including optical gesture capture, a gyroscopic input device, a mouse, a keyboard, an eye-tracking input, and comparable software and/or hardware based technologies. Additionally, the computing device may be a touch-enabled device configured to recognize touch and gesture input provided by an interactive stylus 120, electronic pen, and finger touch 104 for interacting with, editing, and providing content on the computing device.

In an example embodiment, the user 108 may provide handwritten input content and markup on the computing device 102 employing input methods such as touch and pen based input to mark up the content similar to how the user 108 would mark up a document employing a pencil and paper. For example, the user 120 may insert and delete content, add comments and notes, and circle, underline, and cross out content. Handwritten content input on the computing device 102 employing touch and/or pen based input may be referred to as ink, or digital ink. In a system according to embodiments, handwritten ink input may be converted to text annotations employing ink detection and handwriting recognition. The text annotations may be seamlessly integrated into an annotation view of the document. Text annotations may include annotations of handwritten comments and newly inserted content, and may also include changes to the content such as deletion formatting, and style changes.

Figure 2:
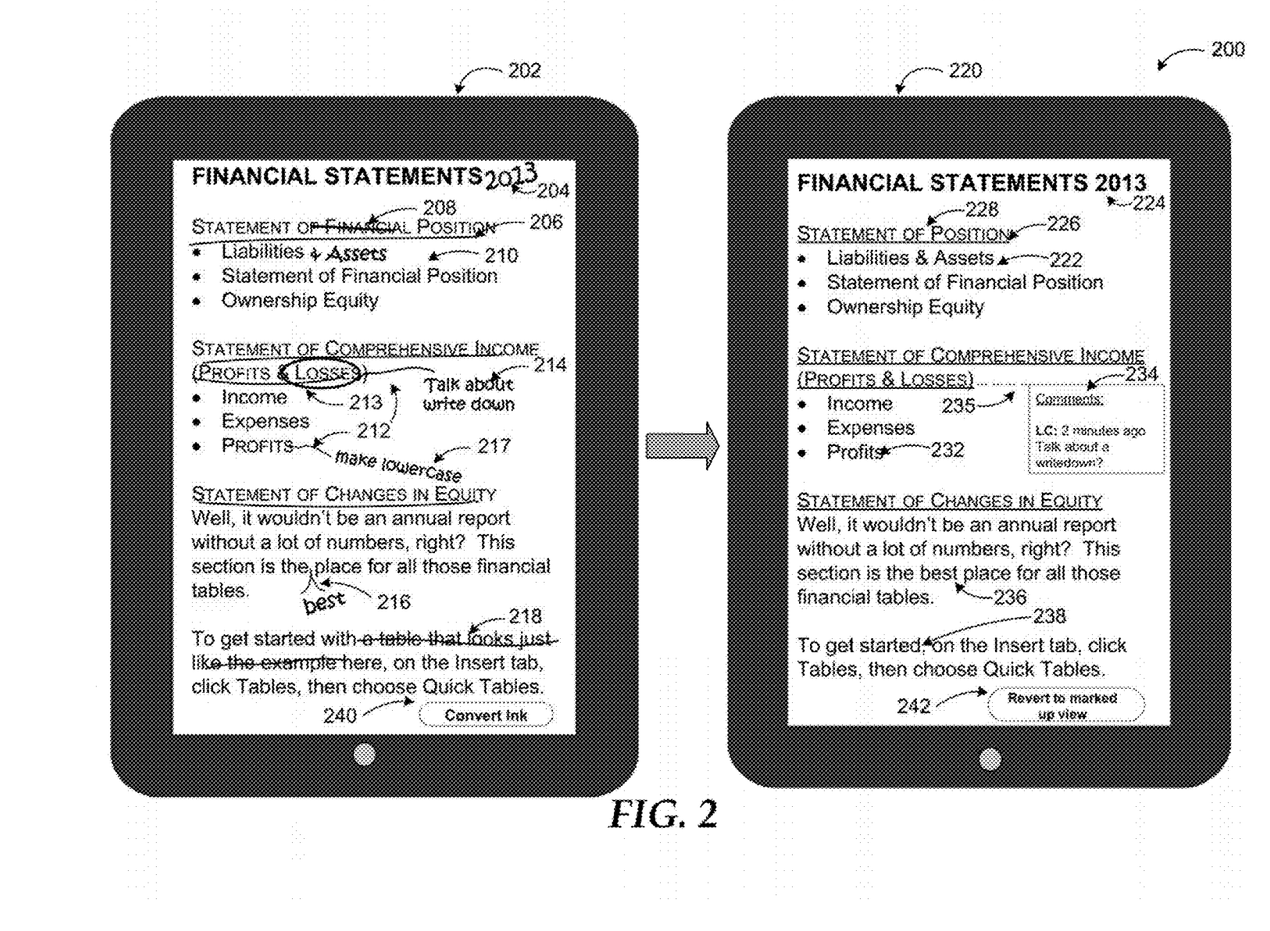
FIG. 2 illustrates example views of a marked up document and a text annotation of the marked up document, according to embodiments.

FIG. 2 illustrates example views of a marked up document and a text annotation of the marked up document, according to embodiments. Diagram 200 demonstrates an example tablet 202 displaying content annotated with handwritten ink input and an example tablet 220 displaying conversion of the handwritten ink input into text annotations on the document.

In a system according to embodiments, a computing device, such as a tablet 202, may display content, such as a word processing document to a user. The user may mark up and edit the document. For example, the user may add notes and comments 214 on the document, circle 213, underline 206, and cross out 208 content, and insert new content 204, 210. The user's handwritten mark up and edits to the document maybe referred to as digital ink or ink input. The document may be provided by an application such as a word processing application. The application may be configured to recognize the ink input and to convert the ink input into text annotations. The text annotations may be seamlessly integrated with the document to incorporate the user's markup and edits into the document. Conversion of ink input to text annotations may be facilitated by the application. Alternatively, the conversion may be facilitated by a standalone application configured to detect ink input on content displayed on a computing device and convert the ink input to text annotations.

In an example embodiment, the converted text annotations may be anchored to a portion of the underlying content annotated by the user. The converted text annotations may be associated with the annotated portion of the content to mirror the user's edits. In an example scenario, a user may provide ink input as comments 214 and notes inserted in between lines of text and within margins of the document. The user may link 212, or otherwise associate the comments 214 to a portion of the text by drawing a line, a circle, an underline, or similar gesture. When the handwritten comments are converted to text annotations, the text annotations may be anchored to the portion of text annotated by the user.

In another example scenario a user may insert a handwritten comment 214 within a margin of the document. The user may draw a line and a circle 213 on a portion of the content associated with the comment 214. When the handwritten comment 214 is converted to a text annotation the annotation may be displayed in a comment box 234. The comment box 234 may be attached to the associated portion of the text with an anchor 235. Alternatively, the application may detect an ink input, such as an instruction 217, to make a change to the content. The instruction 217 may be associated with a portion of the content in response to detecting a user tying 212 the instruction 217 to the portion of the content. The instruction 217 may be matched to an action by searching a data store storing instructions and associated actions. Next, the action associated with the instruction 217 may be applied to the portion of the content 232 in response to converting the instruction to the associated action.

As described above, handwritten ink input may include notes and comments 214 inserted anywhere on the document such as in between lines of text and in margins. Ink input may also include symbols and markings to indicate edits and markups. For example, a user may cross out 208 text to indicate a deletion of the text, and the user may insert a carat 216 or similar symbol with accompanying comments in order to insert text at a desired location. Additionally, the user may insert formatting and stylizing symbols, such as underlining text 206 and inserting punctuation marks and bullets to indicate desired formatting and style edits. The application may be configured to analyze the ink input to identify and differentiate handwritten text from shapes and symbols based on context. This differentiation may enable the application to identify that a line extending from a circled word may be intended to be an arrow pointing to a handwritten comment. Furthermore, the application may be configured to analyze a context of handwritten comments and to convert the handwritten comments to a text annotation based on the context of the handwritten comments. For example, the application may differentiate handwritten comments 214 on the document from content to be inserted within the document, and also from a comment intended as an instruction 217 for editing the content.

In a further example embodiment, the application may be configured to interpret a user's intent based on a context of the ink input. The application may employ grammar and proofing tools to determine if a user's ink input makes sense within a context of the content. For example, when deletions and/or insertions of content are detected, the application may verify that the change does not create a grammatically incorrect or nonsensical sentence. If a potential problem is detected, the application may convert the ink input to a suggested text annotation that may address the potential problem, and may enable the user to accept or reject the suggested text annotation.

In yet another example scenario, the application may suggest a placement of a converted text annotation based on a context of the ink input if the user's intent is ambiguous. For example, a user may insert content 204, 210 onto a document displayed on tablet 202.A1 The user may not include an arrow, line, or other indication of the exact intended placement of the inserted content 204, 210. When the inserted content 204, 210 is converted to text annotations, the application may infer and suggest placement based on the context of the content and may automatically insert the content 224, 222 in the suggested location within the document displayed on the tablet 220. The user may be able to accept, reject, or change the suggested placement. Additionally, in a situation where a user's intentions for placement and/or edits to a portion of content are ambiguous or unclear, the application may present two or more suggested text annotations and may enable the user to accept from the suggestions.

In a system according to embodiments, conversion of ink input to text annotations may be a continuously active feature of a content application executed on a computing device. The application may be continuously configured to detect ink input and to convert the ink input to text annotations. Additionally, ink input detection may be triggered upon detection of an input device such as a stylus, electronic pen, or finger configured to provide ink input to a user interface of the computing device. Further, a user may initiate an ink input conversion session by selecting to turn on an ink detection and conversion feature of the application at any time the user desires.

In some embodiments, the ink input may be converted to text annotations after the user has completed editing an entire document. It may be desirable to provide periodic feedback to the user in order to enable the user to review conversions and correct errors. In an example embodiment, ink input to text annotations may be converted and displayed periodically in order to provide feedback to the user to enable the user to review the converted text annotation. For example, the ink input may be automatically converted to text annotations after detection of each comment or change for providing immediate feedback to the user. Immediate feedback about the text annotation of the handwritten ink input may enable the user to make corrections if necessary.

In some other embodiments, the ink input may be automatically converted to text annotations after a predefined period of time or after detection of a period of time of inactivity. The user may be able to actively select to convert input ink to text annotations by selecting a convert button 240 provided on the document. The convert button 240 may enable the user to control when the user's ink input is converted to text annotations. In addition, after conversion of the ink input to text annotations, the application may retain the original ink input such that the user may be able to switch back and forth 242 between a marked up version of the document including the handwritten ink input and a final version of the document including the converted text annotations.

Figure 3:
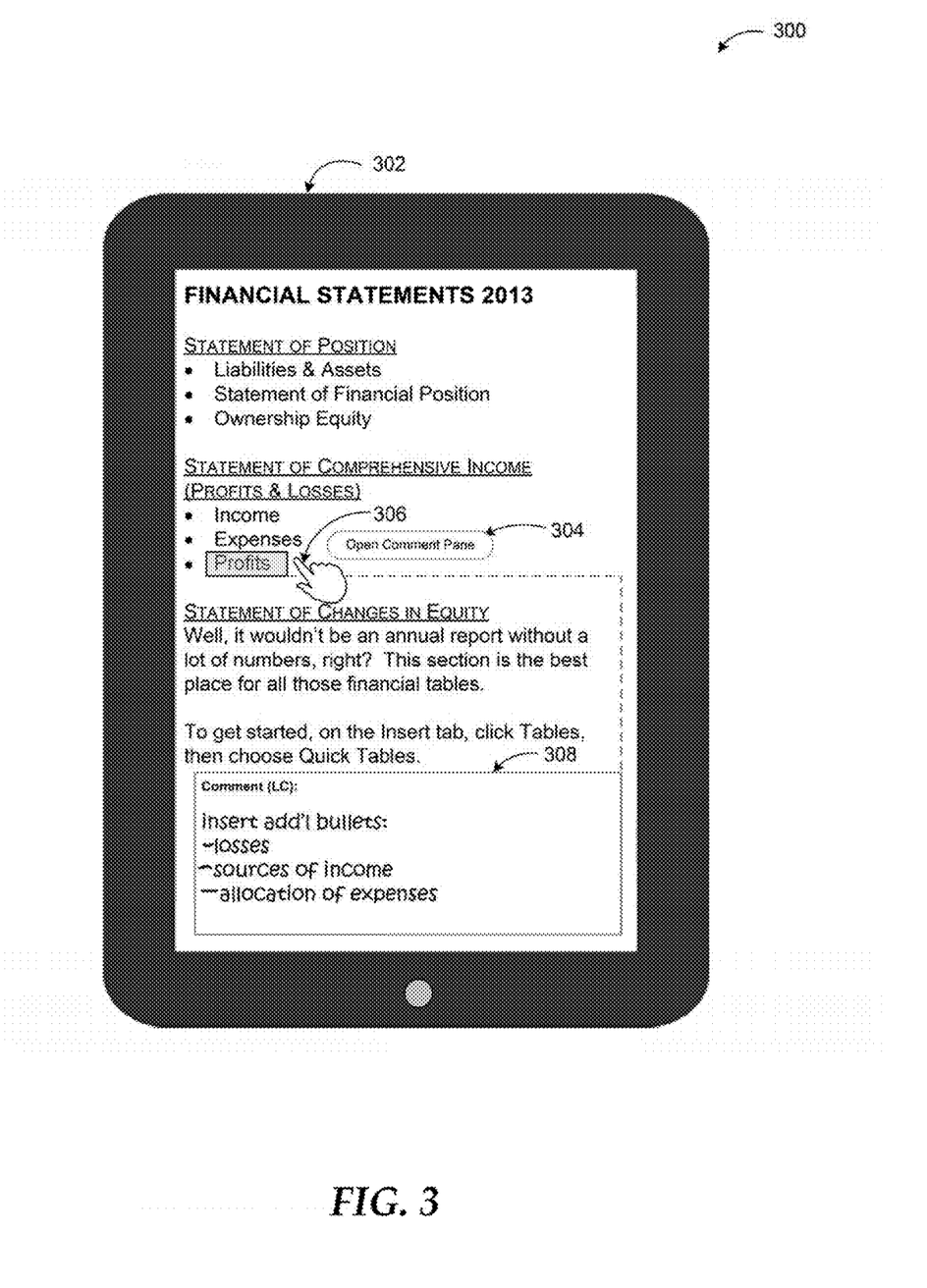
FIG. 3 illustrates an example comment pane to enable of insertion of content, according to embodiments.

FIG. 3 illustrates an example comment pane to enable of insertion of content, according to embodiments. As described above, a user may insert handwritten comments in between lines and in a margin of a document viewed on a computing device.

In an example embodiment, as illustrated in diagram 300, a comment pane 308 may be provided to enable a user to insert comments on a document. An application displaying the content may detect a user action 306 selecting a portion of the document on which the user desires to insert comments. In response to detection of the selection, the comment pane 308 may appear. In an example scenario, in response to detecting the user action 306, the application may display a control button 304 to enable the user to launch a comment pane. Upon selection of the control button 304, the comment pane 308 may be displayed. The comment pane 308 may be displayed at a predefined location on the document (i.e.: the bottom of the page or in the margins of the document.) Alternatively, the comment pane 308 may be displayed as a pop-up pane over a portion of the content. The user may be enabled to customize the location and appearance of the comment pane 308. When the user completes insertion of the handwritten comments into the comment pane 308, the comment pane 308 may be closed, and the handwritten comments may be converted into text annotations and incorporated into the document as previously described.

Figure 4:
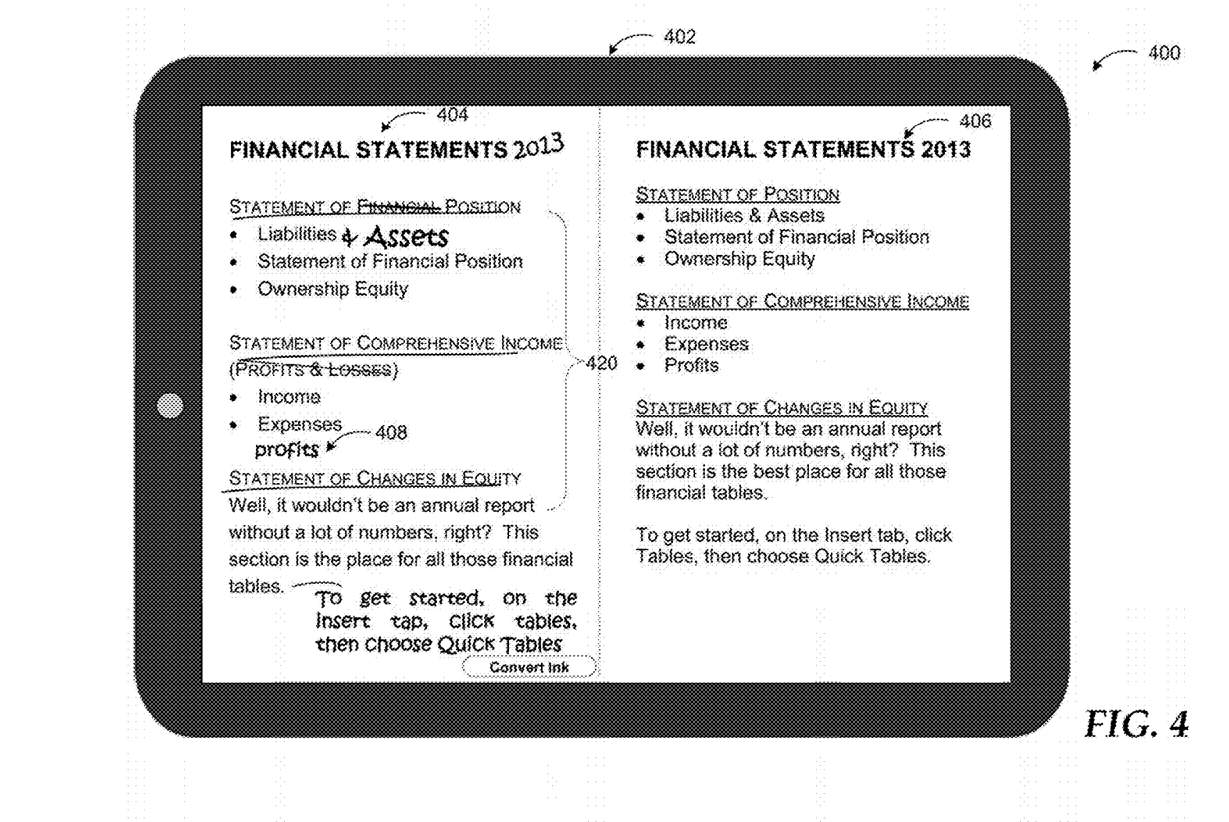
FIG. 4 illustrates an example side by side display of a marked up view and an annotate view, according to embodiments.

FIG. 4 illustrates an example side by side display of a marked up view and an annotation view, according to embodiments. As previously described, a user may view a document on a computing device such as a tablet 402, and the user may annotate the document with handwritten ink input on the user interface of the computing device. The handwritten ink input may be converted to provide a text annotation of the handwritten ink input.

As illustrated in diagram 400, a user may view a marked up version 404 of the document including handwritten ink input alongside an annotation version 406 of the document displaying the converted text annotations. The marked up version 404 and the annotation version 406 may be displayed side by side on a user interface of a computing device such as the tablet 402. Alternatively, the marked up version 404 and the annotation version 406 may be viewed on different devices. For example, a distributed application may display the marked up version 404 on the tablet 402, and an instant of the application may display the annotation version 406 on another device such as a laptop, desktop, or other display. When the marked up version 404 and the annotation version 406 are viewed concurrently, handwritten ink input may be continuously converted to text annotations and presented on the annotation version 406 to provide immediate feedback to the user.

In an example embodiment, the marked up version 404 may display original content and the handwritten ink input provided by a user. The annotation version 406 may provide a track changes view in which changes associated with the text annotation may be displayed and distinguished from original content. A final view may also be provided in which the text annotations may be seamlessly integrated with the original content. For example, in the track changes view, the text annotations may be displayed employing a graphical scheme such as color coding. The text annotations may be displayed in a different color from the original content to distinguish the user's annotations. The user may be enabled to switch to the final view, and the annotations may be displayed in the same color as the original document to present what a final version of the document may look like.

In another example embodiment, when a user provides handwritten ink input on a document, the document may adjust to increase spacing 420 to provide more space for the user to input handwritten comments. Other layout options of the document may also be adjusted to provide more space for the user to input comments, such as increasing the margins and displaying a minimum text size. When the user concludes providing handwritten ink input, the document may adjust to default layout settings.

In yet another example embodiment, the application may store historical data associated with ink input provided by one or more users. The historical data may be analyzed based on context attributes such as user credentials, user preferences, organizational rules, regional settings, and similar ones. The historical data may be used by the application to predict subsequent ink input by a user. In response to detecting a partial ink input, the application may match the partial ink input to an ink input in the historical data. One or more matching ink input suggestions may be provided to the user. Alternatively, the application may auto-complete the partial ink input with a matching ink input. In yet another alternative embodiment, the application may convert the partial ink input based on a matched ink input and provide the associated text annotation.

The example scenarios and schemas in FIG. 1 through 4 are shown with specific components, data types, and configurations. Embodiments are not limited to systems according to these example configurations. Converting handwritten ink input to text annotations may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
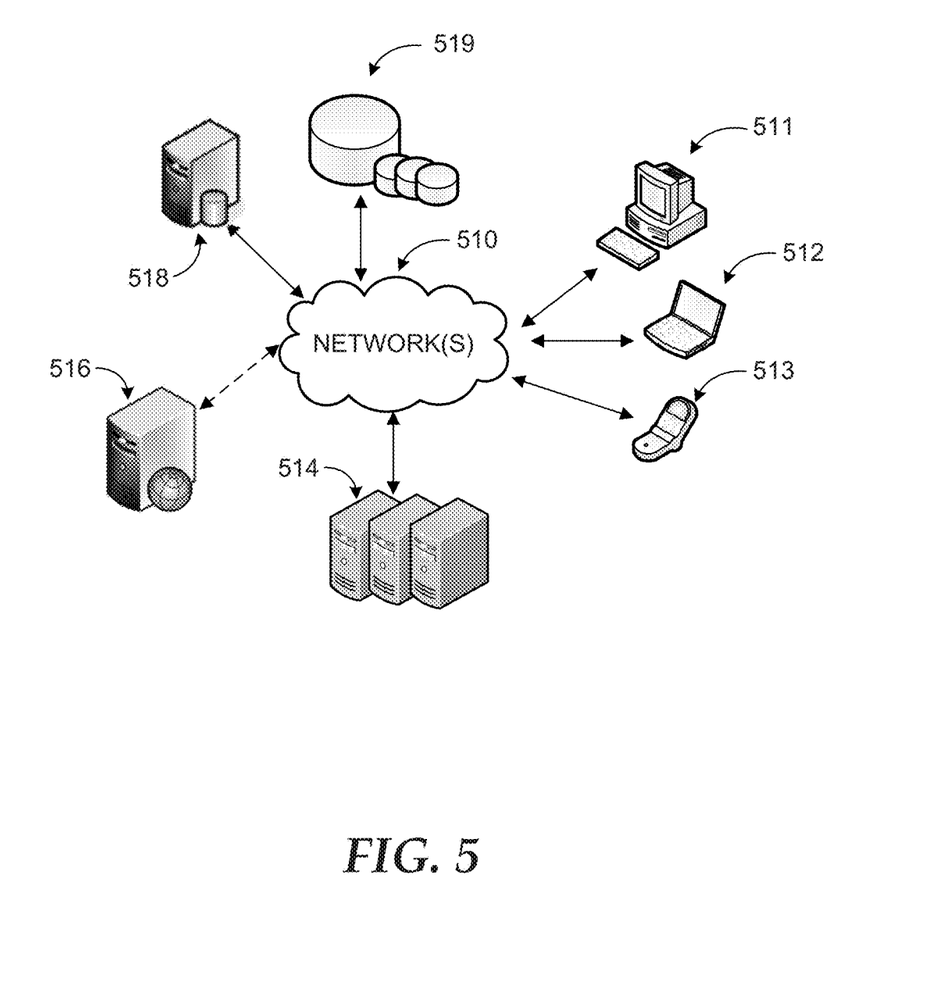
FIG. 5 is a networked environment, where a system according to embodiments may be implemented.

FIG. 5 is a networked environment, where a system according to embodiments may be implemented. Local and remote resources may be provided by one or more servers 514 or a single server (e.g. web server) 516 such as a hosted service. An application may execute on individual computing devices such as a smart phone 513, a tablet device 512, or a laptop computer 511 ('client devices') and communicate with a content resource through network(s) 510.

As discussed above, an application executed on a computing device may provide content and may enable a user to provide handwritten ink input on an interface of the computing device to interact with the content. The application may convert the handwritten ink input to provide a text annotation of the ink input on a document. Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to convert handwritten ink input to text annotations. Furthermore, the networked environments discussed in FIG. 5 are for illustration purposes only. Embodiments are not limited to the example applications, modules, or processes.

Figure 6:
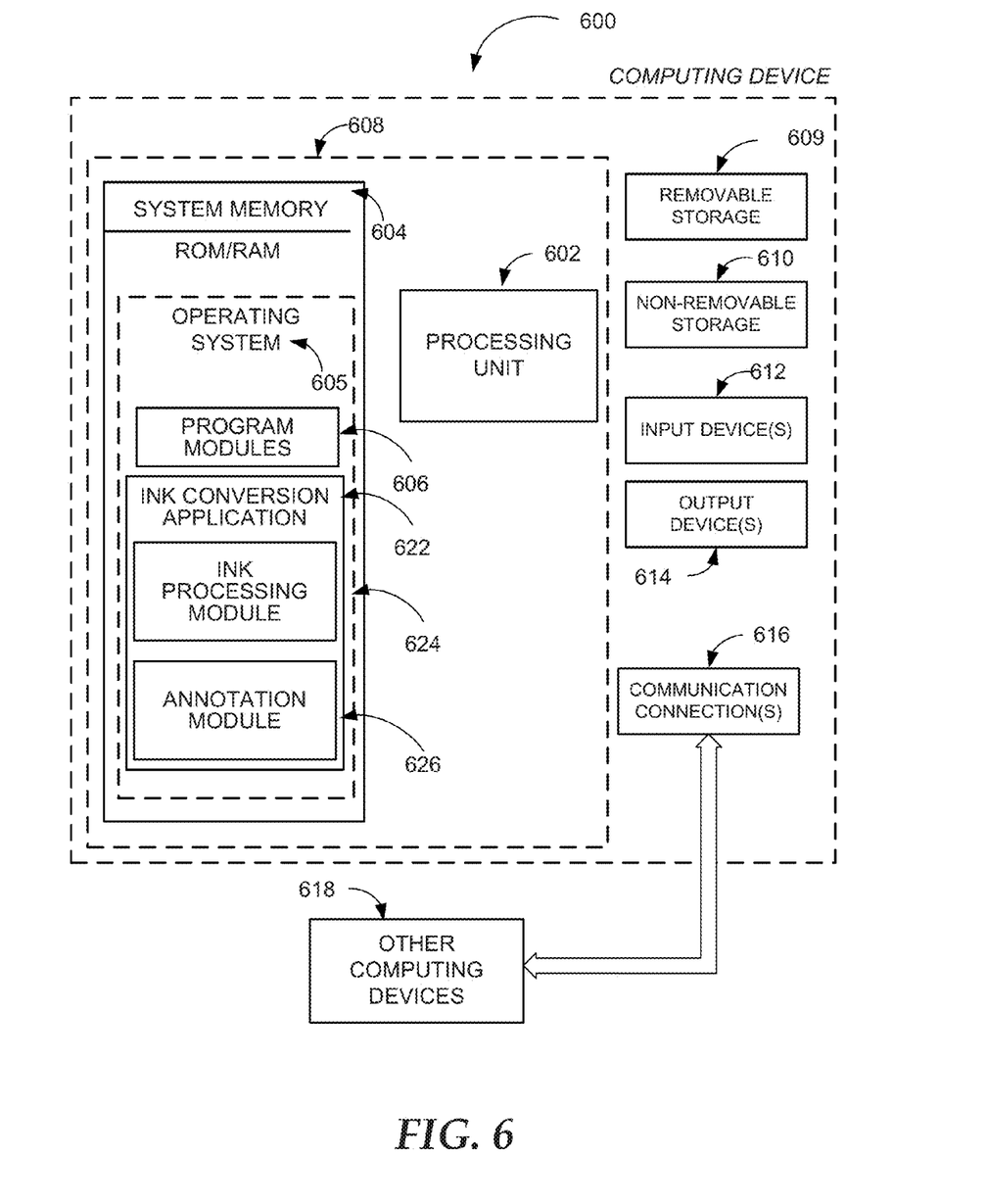
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® and WINDOWS PHONE® operating systems from MICROSOFT CORPORATION of Redmond, Wash. The system memory 604 may also include one or more software applications such as program modules 606, an ink conversion application 622, an ink processing module 624, and an annotation module 626.

An ink conversion application 622 may detect an action to provide handwritten ink input to provide and edit content viewed on a user interface of a computing device. The handwritten ink input may be provided by a touch and/or electronic pen or stylus based input. The ink processing module 624 may detect the ink input, and perform handwriting analysis to differentiate text from symbols and shapes. The annotation module 626 may further process the handwritten ink input to convert the ink input to text annotations based on a context of the ink input. The text annotations may be displayed on the document in an annotation view by the application 622. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
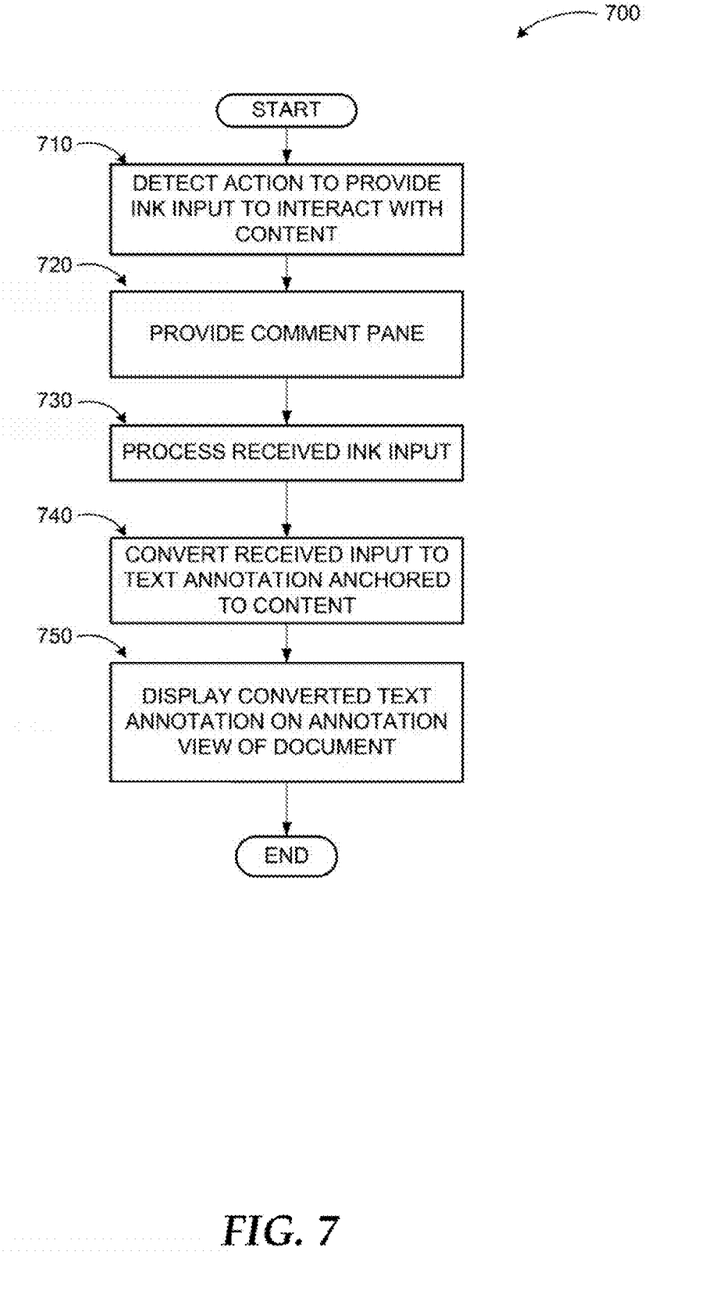
FIG. 7 illustrates a logic flow diagram for a process of converting ink content with an annotation in an e-reader according to embodiments.

FIG. 7 illustrates a logic flow diagram for a process appending content with an annotation in an e-reader according to embodiments. Process 700 may be implemented by a content providing application in some examples.

Process 700 may begin with operation 710 where the application may detect an action to provide ink input to interact with content viewed on a computing device. Ink input may be detected by a gesture, touch, pen, mouse, or similar input capable computing device. Handwritten ink input may include insertion of comments, insertion and deletion of text, and markups to original content. At operation 720, a comment pane may be displayed adjacent to the content to enable a user to provide handwritten ink comments. At operation 730, the application may process the received ink input to differentiate text from shapes and symbols. Comments, text, and actions may also be differentiated. At operation 740, the processed ink input may be converted to text annotations. The text annotations may include comments, inserted and deleted content, and changes to the content. The text annotations may be anchored to an associated portion of the content. At operation 750, the converted text annotations may be displayed in an annotation view. In the annotation view, the converted text annotations may be integrated into the document to incorporate the user's markup and edits.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Converting handwritten ink input to text annotations according to embodiments, may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for converting a handwritten ink input to text representations, the method comprising:
   detecting an action to provide ink input on content viewed on the computing device;
   analyzing a context of the ink input;
   converting the ink input to a text annotation;
   suggesting a placement of the text annotation based on the context of the ink input in response to a determination that an intent of the action is ambiguous;
   detecting one of an acceptance action and an edit action on the text annotation in response to the suggested placement of the text annotation; and
   displaying the text annotation in an annotation view on a user interface of the computing device.

2. The method of claim 1, further comprising:
   determining a portion of the content associated with the ink input; and
   anchoring the text annotation to the portion of the content associated with the ink input.

3. The method of claim 2, wherein determining the portion of the content associated with the ink input further comprises:
   detecting an indication associating the portion of the content with the ink input, wherein the indication includes one or more of: a circle, a line, and an arrow connecting the ink input to the portion of the content.

4. The method of claim 1, further comprising:
   displaying a comment pane adjacent to the content on the user interface of the computing device; and
   detecting the ink input provided in the comment pane.

5. The method of claim 1, wherein the ink input includes the handwritten ink input provided by an input device through detection of one or more of: a touch action, a stylus action, a mouse action, and an electronic pen action on the user interface of the computing device.

6. The method of claim 1, further comprising:
   detecting one or more of: an insertion of a comment, an insertion of text, a deletion of the text, an insertion of symbols, an insertion of shapes, and an insertion of markups into a portion of the content.

7. The method of claim 6, wherein detecting markups on the portion of the content includes detecting one or more of: crossing out the content, underlining the content, circling the content, inserting punctuation marks into the content, inserting style symbols into the content, and inserting formatting symbols into the content.

8. The method of claim 1, further comprising:
processing the ink input to differentiate one or more of: text, shapes, and symbols from one or more of: a comment, text intended for insertion into the content, and an instruction for another action intended to be performed on the content.

9. The method of claim 1, further comprising:
providing a button for activating conversion of the ink input to the text annotation; and
converting the ink input to the text annotation in response to a detection of selection of the button by a user.

10. The method of claim 1, further comprising:
periodically converting the ink input to the text annotation at predefined time intervals.

11. The method of claim 1, further comprising:
inferring an intent of a user based on the context of the ink input on the content; and
converting the ink input to the text annotation based on the intent of the user.

12. The method of claim 1, further comprising:
converting the ink input to the text annotation based on employing a grammar analysis and a proofreading analysis of the ink input on the content.

13. A computing device for converting a handwritten ink input to text representations, the computing device comprising:
a memory configured to store instructions; and
a processing unit coupled to the memory, the processing unit executing an application in conjunction with the instructions stored in the memory, wherein the application is configured to:
detect an action to provide ink input on content viewed on the computing device;
analyze a context of the ink input;
convert the ink input to a text annotation;
suggest a placement of the text annotation based on the context of the ink input in response to a determination that an intent of the action is ambiguous;
detect one of an acceptance action and an edit action on the text annotation in response to the suggested placement of the text annotation; and
display the text annotation in an annotation view on a user interface of the computing device.

14. The computing device of claim 13, wherein the computing device is a touch-enabled device, and wherein the computing device includes one or more of: a smart phone, a reader device, a tablet, a display, and a laptop computer.

15. The computing device of claim 14, wherein ink input includes a handwritten ink input provided by an input device through detection of one or more of: a touch action, a stylus action, a mouse action, and an electronic pen action on the user interface of the computing device.

16. The computing device of claim 13, wherein a marked up version of the content is displayed adjacent to the annotation view of the content on the user interface of the computing device.

17. A computer-readable memory device with instructions stored thereon for converting a handwritten ink input to text representations, the instructions comprising:
detecting an action to provide ink input on content viewed on a computing device;
analyzing a context of the ink input;
converting the ink input to a text annotation;
determining a portion of the content associated with the ink input;
suggesting a placement of the portion of the content based on the context of the ink input in response to a determination that an intent of the action is ambiguous;
detecting one of an acceptance action and an edit action on the portion of the content in response to the suggested placement of the text annotation; and
displaying the text annotation anchored to the portion of the content associated with the ink input in an annotation view on a user interface of the computing device.

18. The computer-readable memory device of claim 17, wherein the instructions further comprise:
converting the ink input to the text annotation at one or more of a predefined time interval and another action.

19. The computer-readable memory device of claim 17, wherein the instructions further comprise:
retaining the ink input after the conversion to enable switching between the text annotation and the ink input.

20. The computer-readable memory device of claim 17, wherein the instructions further comprise:
in response to a detection of the action to provide the ink input, increasing a spacing between lines of the content to enable ease of ink markups.

* * * * *